US011445352B2

(12) United States Patent
Kothari et al.

(10) Patent No.: US 11,445,352 B2
(45) Date of Patent: Sep. 13, 2022

(54) SYSTEM AND METHOD FOR IMPLEMENTING A SOFTPHONE EMERGENCY DIALING ARCHITECTURE

(71) Applicant: JPMorgan Chase Bank, N.A., New York, NY (US)

(72) Inventors: Jigar Ajay Kothari, West New York, NJ (US); Russell Austin, London (GB); Suresh Thankappan, Shrewsbury, MA (US); Hernán P. Seoane, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/168,912

(22) Filed: Feb. 5, 2021

(65) Prior Publication Data

US 2021/0243585 A1 Aug. 5, 2021

Related U.S. Application Data

(60) Provisional application No. 62/970,299, filed on Feb. 5, 2020.

(51) Int. Cl.
*H04W 4/90* (2018.01)
(52) U.S. Cl.
CPC ................... *H04W 4/90* (2018.02)
(58) Field of Classification Search
CPC ........ G08B 13/19669; G08B 13/19695; G08B 25/008; G08B 25/016; H04L 65/1006;
(Continued)

(56) References Cited

U.S. PATENT DOCUMENTS

2007/0104184 A1* 5/2007 Ku ..................... H04L 29/1216
709/204
2008/0013523 A1 1/2008 Nambakkam
(Continued)

OTHER PUBLICATIONS

Notification of Transmittal of the International Search Report and the Written Opinion of the International Searching Authority issued in PCT/US2021/016753 dated Apr. 21, 2021.
(Continued)

*Primary Examiner* — Maria El-Zoobi
(74) *Attorney, Agent, or Firm* — Greenblum & Bernstein, P.L.C.

(57) ABSTRACT

An embodiment of the present invention is directed to intelligently routing softphone emergency calls. The innovative system and method comprises: receiving, via an interface, an emergency interaction from the user, wherein the user is located at a remote region that is different from the registered home region and wherein the interface that communicates with a user via a device that executes a softphone application registered at a home region; validating, a computer processor, the emergency interaction against a network switch identifier; performing a database dip to identify caller information including current location data; communicating, via the interface, a confirmation message to the user; routing, via a cloud communication platform, a call to a regional session border controller based at least in part on the current location data; and executing, via the computer processor, an emergency call with a local calling number associated with the remote region.

20 Claims, 2 Drawing Sheets

(58) Field of Classification Search
CPC ............... H04L 65/102; H04L 65/1069; H04L 65/1073; H04L 67/02; H04L 12/66; H04L 45/306; H04L 61/2015; H04L 67/18; H04M 11/04; H04M 2242/04; H04M 3/00; H04M 5/00; H04M 7/00; H04M 3/42042; H04W 4/90; H04W 76/50
USPC ...................................................... 455/404.1
See application file for complete search history.

(56) References Cited

U.S. PATENT DOCUMENTS

| | | |
|---|---|---|
| 2009/0122726 A1 | 5/2009 | Gilboa et al. |
| 2013/0059560 A1 | 3/2013 | Ray et al. |
| 2015/0312738 A1* | 10/2015 | Deich .................. H04M 3/5116 370/328 |
| 2016/0255483 A1* | 9/2016 | Parlamas ................ H04W 4/90 455/404.2 |
| 2018/0026966 A1* | 1/2018 | Saridaki ................ H04L 61/309 726/8 |

OTHER PUBLICATIONS

Sunil el al. "Implementation of Emergency Call Notification-Advanced PBX Feature using SIP protocol." (IJCSIT) International Journal of Computer Science and Information Technologies, vol. 5 (4). 2014 (2014) Retrieved on Apr. 3, 2021 (Apr. 3, 2021) from <https://citeseerx.ist.psu.edu/viewdoc/download?doi=10.1.1.445.2691&rep=rep1&type=pdf> entire document.

* cited by examiner

SYSTEM AND METHOD FOR IMPLEMENTING A SOFTPHONE EMERGENCY DIALING ARCHITECTURE

CROSS REFERENCE TO RELATED APPLICATIONS

The application claims priority to U.S. Provisional Application 62/970,299, filed Feb. 5, 2020, the contents of which are incorporated herein in their entirety.

FIELD OF THE INVENTION

The invention relates generally to a system and method for implementing a softphone emergency dialing architecture.

BACKGROUND OF THE INVENTION

Global mobile users of a softphone client generally require an ability to call emergency services while travelling. If an emergency call is initiated from a remote office, call routing may be required to force the call from the remote office as opposed to the caller's home or local office. This leads to delayed responses to emergencies and attention to urgent situations.

These and other drawbacks exist.

SUMMARY OF THE INVENTION

According to one embodiment, the invention relates to a system that implements a softphone emergency dialing architecture. The system executes an emergency dialing feature on a softphone implementation. The system comprises: an interface that communicates with a user via a device that executes a softphone application registered at a home region; and a computer processor, coupled to the interface, programmed to perform the steps of: receiving an emergency interaction from the user, wherein the user is located at a remote region that is different from the registered home region; validating the emergency interaction against a network switch identifier; performing a database dip to identify caller information including current location data; communicating, via the interface, a confirmation message to the user; routing, via a cloud communication platform, a call to a regional session border controller based at least in part on the current location data; and executing an emergency call with a local calling number associated with the remote region.

According to another embodiment, the invention relates to a method that implements a softphone emergency dialing architecture. The method executes an emergency dialing feature on a softphone implementation. The method comprises the steps of: receiving, via an interface, an emergency interaction from the user, wherein the user is located at a remote region that is different from the registered home region and wherein the interface that communicates with a user via a device that executes a softphone application registered at a home region; validating, a computer processor, the emergency interaction against a network switch identifier; performing a database dip to identify caller information including current location data; communicating, via the interface, a confirmation message to the user; routing, via a cloud communication platform, a call to a regional session border controller based at least in part on the current location data; and executing, via the computer processor, an emergency call with a local calling number associated with the remote region.

An embodiment of the present invention may include a specially programmed computer system comprising one or more computer processors, interactive interfaces, electronic storage devices, and networks. The computer implemented system and method described herein provide unique advantages to entities, users, and other participants, according to various embodiments of the invention. With an embodiment of the present invention, a softphone user may be immediately connected to a local emergency service in response to a request. This leads to prompt and timely medical, rescue and other services.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
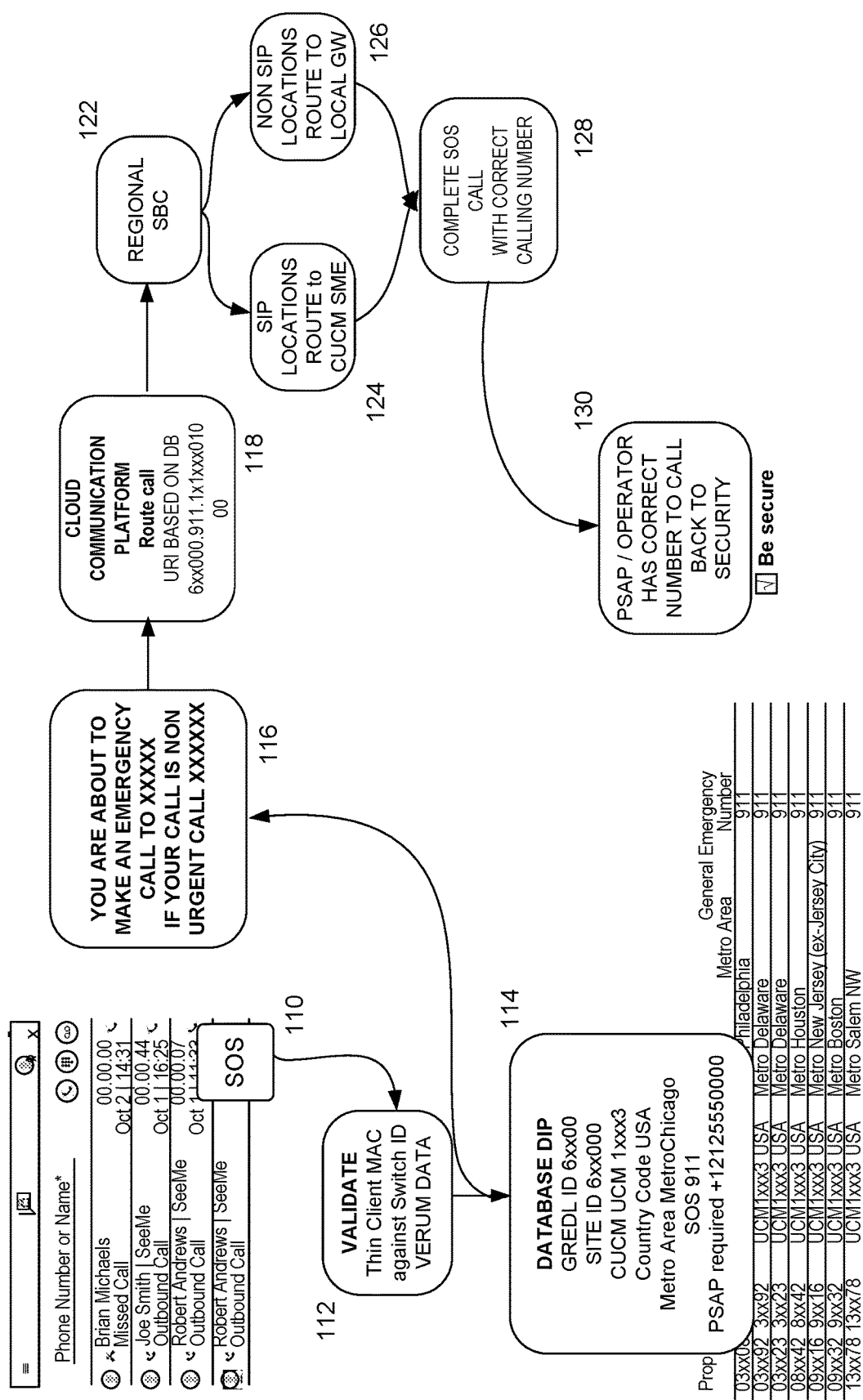
FIG. 1 is an exemplary process flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative architecture for location based emergency dialing. The innovative architecture may support various softphone applications. Softphone applications generally include software programs for making telephone calls over the Internet using a general purpose computer rather than a specific hardware component. For example, softphone applications may be installed on a desktop, mobile device or other computer or processing device that allows the user to replace and receive calls without requiring actual telephone equipment. A softphone application may be installed on an Internet-connected device to make and receive phone calls. Current software applications are fairly non-geographic which poses issues with emergency dialing when users travel outside their home regions.

An embodiment of the present invention recognizes that current softphone applications are registered to a home call manager. This one to one mapping means that softphone applications cannot re-register to a different telephone system. Accordingly, softphone applications will connect to the original or home telephone system.

A user may reside in a home region, such as the UK, and use a softphone application to connect with colleagues and clients. While in the UK, the user may interact with an emergency icon, such as by pressing a SOS button. In this scenario, calls may be routed to a UK phone system to contact UK emergency services. According to another scenario, the user may travel to a remote location and work from a US office location. When the user interacts with an emergency icon in the US by pressing a SOS button for example, the call would be routed to the UK phone system where UK emergency services are contacted, instead of local services in the US.

With an embodiment of the present invention, the UK user located in a remote US office location may initiate emergency services that connect with local emergency services. An embodiment of the present invention may verify or confirm the user's current location and then route the call to a local US phone system based on the user's current location. In addition, an embodiment of the present invention may append a suffix location number for a call back feature. With an embodiment of the present invention, a local emergency service may be contacted to provide prompt medical and emergency services and attention. This avoids delays and confusion in having to reroute calls from the user's local phone system (in this example, the UK phone system) to the user's current remote location.

For example, a user may launch a softphone application from a user's physical desktop or terminal. An embodiment of the present invention may identify the user's current location and then provide location emergency services based on the current location. When the user initiates emergency services, an embodiment of the present invention may provide routing on the backend to ensure that the call traverses local services based on the current location.

An embodiment of the present invention may automatically connect the user with a local emergency service. This may involve automatically dialing the local emergency service. According to another embodiment, the present invention may present a local emergency service number to the user. The user may then initiate contact. Other local emergency information may be presented. For example, instructions, messages, notifications and/or other information may be provided to inform and/or assist the user.

An embodiment of the present invention may provide intelligent routing on the backend. For example, if a UK user dials an emergency service while in the US, an embodiment of the present invention may convert the UK user's number on the backend to dial the local emergency service. In this example, based on the user's current location, an embodiment of the present invention may identify a corresponding local security number. Accordingly, when the user initiates an emergency service, the user may see the local emergency number contacted (e.g., county-wide emergency service). In addition, an embodiment of the present invention may identify regional information including a local security number, global security command center information, etc. This information may vary depending on regions, EMEA, APAC, Americas, etc.

A softphone implementation may include a cell phone, mobile device and other equipment. A softphone implementation may also be supported by virtual desktop infrastructure (VDI). VDI may refer to technology that uses virtual machines to provide and manage virtual desktops. For example, VDI may host desktop environments on a centralized server and deploy them to end users on request. An embodiment of the present invention may identify a user's location through a network repository and then using that data, connect to a local emergency services and/or provide information needed to dial the local emergency services.

An embodiment of the present invention may obtain location information from various sources. For example, location information may be provided by switch information associated with the user's equipment. Location information may vary based on current geographic location, compliance considerations, regulations, preferences, privacy settings and/or other information. For example, location information may vary in level of granularity and may include desk location, office level, floor level, zone level, segments, etc. The level of granularity may also vary based on the size of the building, campus, etc.

An embodiment of the present invention may be available as an API so that other users may use the API in other applications, implementations, architectures and systems.

When a UK user is located in the US, the UK user may initiate an emergency services contact. An embodiment of the present invention may perform a lookup using the user's equipment and identify a switch that the user's equipment is connected to. This information may then be used to identify a physical location and a corresponding number that the user may use for local emergency services dialing. The call may then be routed to a local US phone system that may then reach the US emergency services for the particular location the user is at. In this example, a location check may be performed based on the switch identifier where the user is physical situated.

The user may interact with an emergency services icon (e.g., SOS button) that would validate the user's SIM client MAC address against switch information used in the system. A database dip may relate to emergency dialing information and other information which may include seating location, building description, relevant personal emergency information, etc. Other information may relate to what the user needs to dial, where the user's emergency needs to be sent, emergency contact, special emergency instructions/actions, etc.

An embodiment of the present invention may further recognize that different regions may have different requirements. For calls in the US, an embodiment of the present invention may traffic the user's number to provide call-back support. When a UK user is in the US and needs to request emergency services, rather than displaying the UK user's +44 number, an embodiment of the present invention may provide a local number. The local number may be a local building number, a local security team or other designated local number. This requirement may not be needed in other regions.

FIG. 1 is an exemplary process flow, according to an embodiment of the present invention. As shown in FIG. 1, a user may initiate an emergency call. This may involve interacting with a SOS icon, represented by 110. At 112, Thin Client MAC may be validated against a switch identifier. According to an exemplary embodiment, validation may be performed against technology infrastructure and referential data, such as Verum data which represents an authoritative source of data. This data may align to reference data management program's practices and guidelines for technology equipment. Other source data may be applied for validation.

At 114, a database dip may be performed to retrieve call information. This may include a current physical location, office building information, seating area, local number associated with the user, etc. For example, database dip may retrieve information such as GREDL ID, SITE ID, CUCM UCM, Country Code, Metro Area, etc. GREDL (Global Real Estate Data Library) ID may represent data from a repository of building information and related financial data within an entity. For example, GREDL may provide users with detailed information for various locations globally. In the example of a financial institution, this data may include bank locations including ATMs. Information may include building name, address, photos, maps, viewable floor plans, contacts, headcount, lease summaries, financials, cost center allocations, fixed asset values, and scanned legal document images. Each site may have an individual Site ID for identification.

Other information may identify a unified communications manager (e.g., CUCM UCM) which may be associated with an enterprise call control and session management platform that connects users anywhere using a phone or other mobile device.

At 116, a user interface may communicate a message that indicates to the user that an emergency call is about to be initiated. Other messages and instructions may be provided. At 118, a call may be routed via a cloud communication platform. In this example, the platform may be Kandy Platform. Other cloud communications platform may be implemented. A directory URI may represent a uniform resource identifier that may be used to identify a directory number. This may represent an amended form of the user's extension number based on information from the database.

At 122, a call may be routed to a Regional SBC. At 124, SIP locations may route to communication manger, e.g., Cisco Unified Communication Manager (CUCM) Session Manager Edition (SME). At 126, non-SIP locations may route to a local gateway. According to an exemplary illustration, an entity may use a combination of SIP and non-SIP connectivity. SIP is built on the SIP protocol and uses the Internet and data networks to transmit voice calls and is more flexible than some older methods. Other methods may include a Primary Rate Interface (PRI) which may be based on a telecommunications interface standard used on an Integrated Services Digital Network (ISDN) (also known as non-SIP) and generally requires terminating equipment (e.g., gateways) located on site.

At 128, a SOS call may be completed with a correct calling number. At 130, an operator may receive the correct calling number for call back and other features. This may be useful to dispatch medical and other assistance.

While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
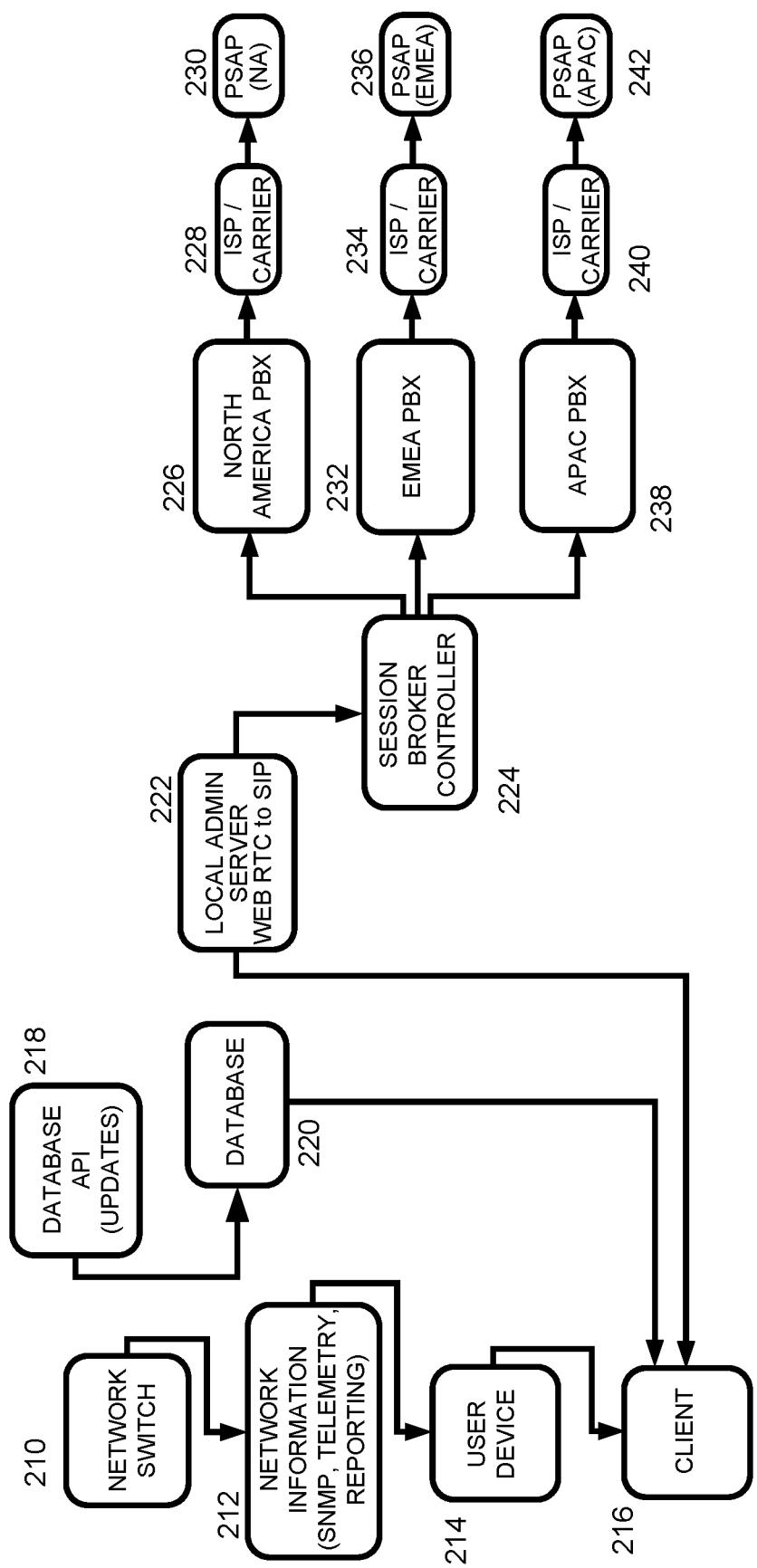
FIG. 2 is an exemplary architecture diagram, according to an embodiment of the present invention.

FIG. 2 is an exemplary architecture diagram, according to an embodiment of the present invention. As shown in FIG. 2, Client 216 may represent a user of a mobile device that implements a soft phone application. For example, Client 216 may represent an employee of a company. An exemplary user device is represented by 214, which communicates network information 212 using a network switch 210 and/or other network communication components. Network information may include SNMP (Simple Network Management Protocol), Telemetry, Reporting, etc. Client 216 may receive and/or access data through Database 220, which receives updates via Database API 218. Client 216 may also communicate with a Local Admin Server 222. In this example, Local Administrator Server 222 may include a Local Kandy Admin Server that provides WebRTC to SIP services. WebRTC represents Web Real-Time Communication that provides web browsers and mobile applications with real-time communication (RTC) via APIs. Session Initial Protocol (SIP) represents a signaling protocol used for real-time sessions including voice, video, etc. Local Administrator Server 222 may communicate with Session Broker Controller 224 to various regions represented by North America Private Branch Exchange (PBX) 226, Europe, Middle East and Africa (EMEA) PBX 232 and Asia-Pacific (APAC) PBX 238. PBX represents a private telephone network used within a client, company or organization. Users may communicate internally within the client, company or organization as well as externally. As shown in FIG. 2, North America PBX 226 may communicate to Internet Service Provider (ISP) and/or phone/cellular service provider, represented by ISP/Carrier 228 and Public Safety Answering Point (PSAP) 230. PSAP may represent a call center that answers calls to an emergency number. EMEA PBX 232 may communicate to ISP/Carrier 234 and PSAP 236. APAC PBX 238 may communicate to ISP/Carrier 240 and PSAP 242. Other regions may be supported, in accordance with the various embodiments of the present invention.

An embodiment of the present invention may provide various end user services. An embodiment of the present invention may analyze metrics and other data. This data may be used to provide user forecasts and predictions. An embodiment of the present invention may also provide full API integration with various services, applications and/or other systems.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that executes an emergency dialing feature on a softphone implementation, the system comprising:
    an interface that communicates with a user via a device that executes a softphone application registered at a home region; and
    a computer processor, coupled to the interface, programmed to perform the steps of:
        receiving an emergency interaction from the user originating from a remote region that is different from the registered home region;
        validating, based on the emergency interaction, a thin client MAC against a network switch identifier, where the validation is performed against a technology infrastructure and referential data;
        performing a database dip to identify caller information including current location data;
        communicating, via the interface, a confirmation message to the user;
        routing, via a cloud communication platform, a call to a regional session border controller based at least in part on the current location data; and
        executing an emergency call with a local calling number associated with the remote region.

2. The system of claim 1, wherein the computer processor is further programmed to perform the step of: routing SIP (Session Initial Protocol) location data or non-SIP location data.

3. The system of claim 2, wherein SIP location data is routed to a communication manager.

4. The system of claim 2, wherein non-SIP location data is routed to a local gateway.

5. The system of claim 1, wherein the database dip further relates to location building information and seating information.

6. The system of claim 1, wherein the computer processor is further programmed to: implement a session broker controller to communicate with a plurality of region private branch exchanges.

7. The system of claim 1, wherein the home region is a first country and the remote region is a second country that is different from the first country.

8. The system of claim 1, wherein the home region is one of: North America, EMEA (Europe, Middle East and Africa), and APAC (Asia-Pacific).

9. The system of claim 1, wherein the local calling number is appended with a suffix location number that allows for a call-back feature.

10. The system of claim 1, further comprising a local administrator server that provides WebRTC (Web Real-Time Communication) to SIP (Session Initial Protocol) services.

11. A method that executes an emergency dialing feature on a softphone implementation, the method comprising the steps of:
  receiving, via an interface, an emergency interaction from the user originating from a remote region that is different from the registered home region and wherein the interface that communicates with a user via a device that executes a softphone application registered at a home region;
  validating, via a computer processor and based on the emergency interaction, a thin client MAC against a network switch identifier, where the validation is performed against a technology infrastructure and referential data;
  performing a database dip to identify caller information including current location data;
  communicating, via the interface, a confirmation message to the user;
  routing, via a cloud communication platform, a call to a regional session border controller based at least in part on the current location data; and
  executing, via the computer processor, an emergency call with a local calling number associated with the remote region.

12. The method of claim 11, further comprising the step of:
  routing SIP (Session Initial Protocol) location data or non-SIP location data.

13. The method of claim 12, wherein SIP location data is routed to a communication manager.

14. The method of claim 12, wherein non-SIP location data is routed to a local gateway.

15. The method of claim 11, wherein the database dip further relates to location building information and seating information.

16. The method of claim 11, wherein the computer processor is further programmed to: implement a session broker controller to communicate with a plurality of region private branch exchanges.

17. The method of claim 11, wherein the home region is a first country and the remote region is a second country that is different from the first country.

18. The method of claim 11, wherein the home region is one of: North America, EMEA (Europe, Middle East and Africa), and APAC (Asia-Pacific).

19. The method of claim 11, wherein the local calling number is appended with a suffix location number that allows for a call-back feature.

20. The method of claim 11, wherein a local administrator server provides WebRTC (Web Real-Time Communication) to SIP (Session Initial Protocol) services.

\* \* \* \* \*